United States Patent [19]
Mims et al.

[11] Patent Number: 5,392,825
[45] Date of Patent: Feb. 28, 1995

[54] PRESSURE REGULATOR WITH A FLASHBACK ARRESTOR

[75] Inventors: Carl W. Mims, Sanger; Roger D. Zwicker, Arlington, both of Tex.

[73] Assignee: Victor Equipment Company, St. Louis, Mo.

[21] Appl. No.: 101,702

[22] Filed: Aug. 3, 1993

[51] Int. Cl.6 .............................................. F16K 31/12
[52] U.S. Cl. ............................. 137/614.2; 137/505.42; 137/549; 251/118; 48/192
[58] Field of Search .............. 137/613, 614.11, 614.12, 137/505.42, 614.2, 549; 251/118; 431/22; 48/191, 192; 222/189

[56] References Cited

U.S. PATENT DOCUMENTS

| | | | |
|---|---|---|---|
| 2,087,356 | 7/1937 | Parker | 137/549 X |
| 2,417,670 | 1/1944 | Anthes | |
| 2,609,281 | 9/1948 | Smith | |
| 2,611,424 | 7/1948 | Smith | |
| 3,386,665 | 6/1968 | Iozzi et al. | |
| 3,388,962 | 7/1966 | Baumann | |
| 3,748,111 | 7/1973 | Klose | 48/192 |
| 3,926,208 | 12/1975 | Hoffman et al. | 137/505.42 X |
| 3,933,444 | 1/1976 | Kilgore | 137/465 X |
| 4,088,436 | 5/1978 | Alferes | 431/22 X |
| 4,192,344 | 3/1980 | Masuya et al. | 137/549 X |
| 4,251,226 | 2/1981 | Nishikawa | 48/192 |
| 4,286,620 | 9/1981 | Turney | |
| 4,361,420 | 11/1982 | Bell | |
| 4,409,002 | 10/1983 | Zwicker | |
| 4,664,621 | 5/1987 | Sugisaki et al. | |
| 4,806,096 | 2/1989 | Kobayashi | |
| 4,818,220 | 4/1989 | Kobayashi | |
| 4,946,047 | 8/1990 | Kurokawa et al. | 137/549 X |

Primary Examiner—Martin P. Schwadron
Assistant Examiner—Kevin L. Lee
Attorney, Agent, or Firm—Herzog, Crebs & McGhee

[57] ABSTRACT

A gas pressure regulator for regulating the output pressure of a gas from a pressurized gas cylinder includes a flashback assembly disposed at the gas outlet of the pressure regulator. The flashback assembly includes three primary components as follows: a porous metal flashback arrestor, a retainer, and a check valve sub-assembly. In the preferred embodiment, the porous metal flashback arrestor is mounted on one end of the retainer and the check valve sub-assembly is disposed within the retainer adjacent the metal flashback arrestor. The flashback assembly can be easily removed and replaced. The porous metal flashback arrestor is designed to reduce the possibility of migration of a flashback upstream from the torch and hose into the pressure regulator. The check valve sub-assembly is designed to reduce the possibility of reverse flow of gas upstream from the hose into the pressure regulator.

7 Claims, 6 Drawing Sheets

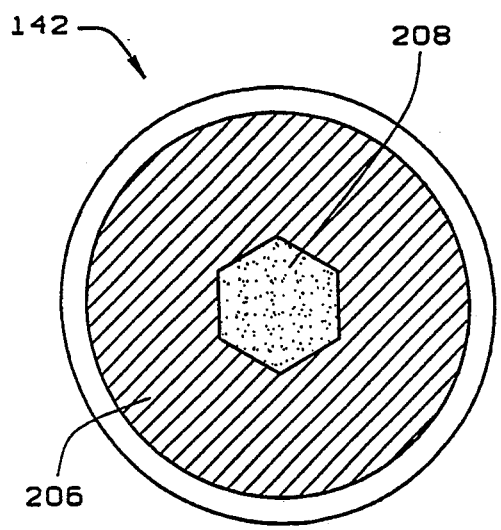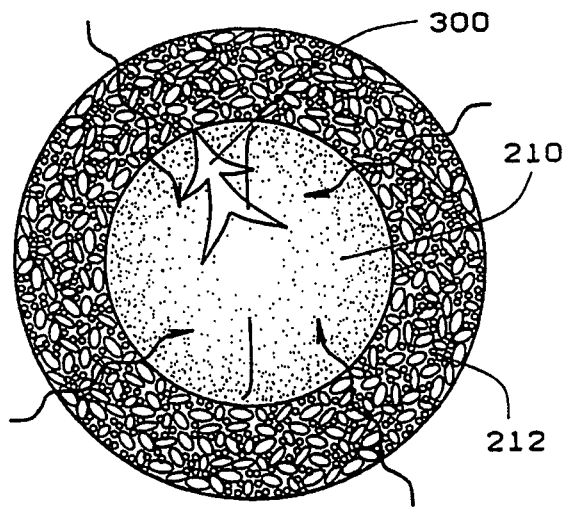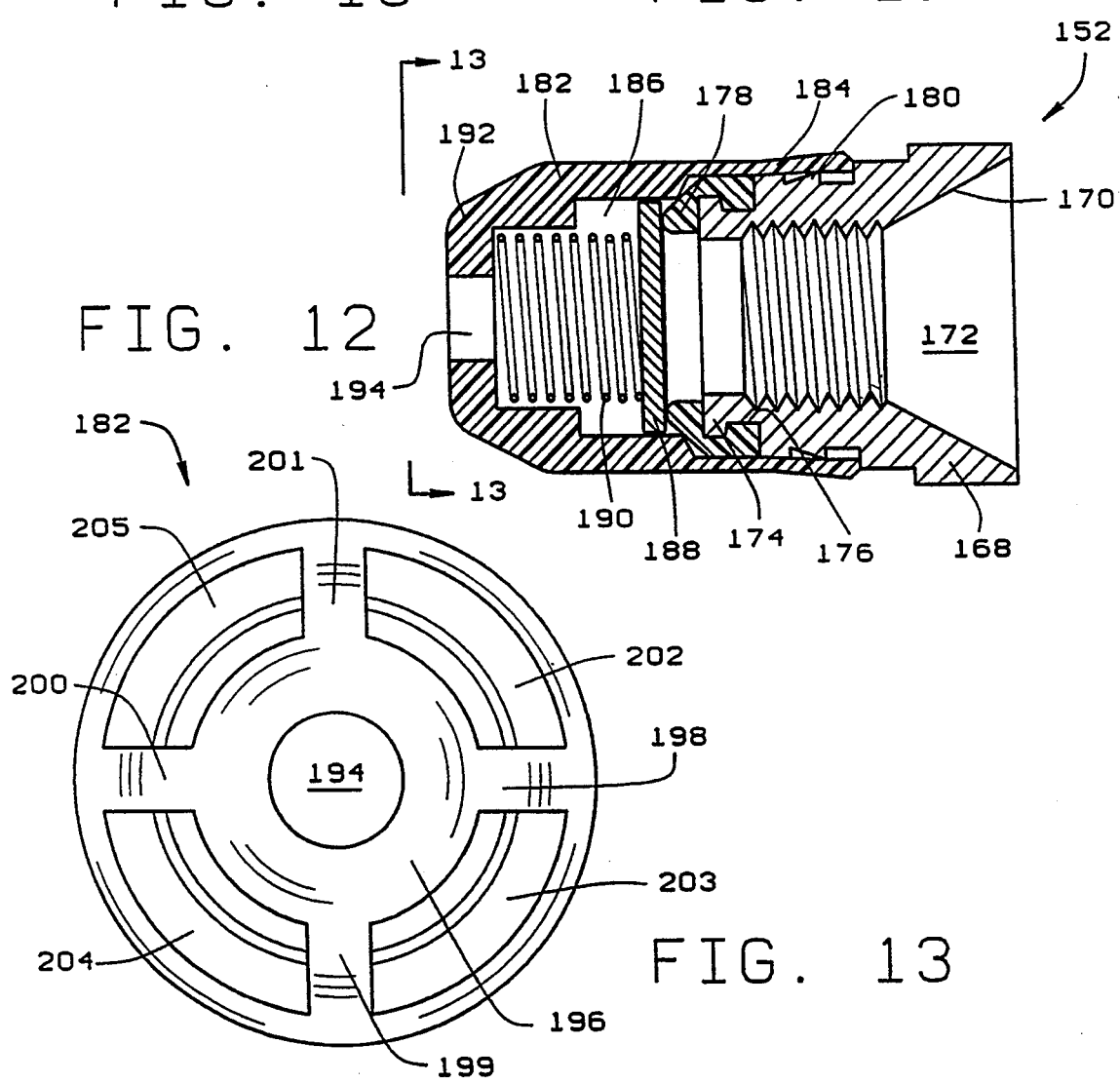

PRESSURE REGULATOR WITH A FLASHBACK ARRESTOR

BACKGROUND OF THE INVENTION

1. Field of the Invention

This invention relates to gas pressure regulators and, more particularly, to gas pressure regulators for oxy fuel torches that are used to cut ferris metals. These cutting torches operate with a fuel gas and oxygen. Acetylene is a commonly used fuel gas; however, other types of fuel gas are also used, including, for example, natural gas, propane, hydrogen, and MAPP gas.

2. Description of Prior Art

Flashback is a term used to denote a situation which can occur in oxy fuel cutting torches and multi-purpose torches such as those described above. When a flashback occurs, it may cause damage to the equipment. In some instances, personal injury also results to the operator and/or those in proximity to the equipment. The present invention does not eliminate the occurrence of flashbacks. The purpose of the present invention is to reduce the possibility that a flashback, should it migrate from the torch upstream through the hose to the pressure regulator, will enter the oxygen and fuel cylinders.

Those skilled in this art are familiar with the components in a typical oxy fuel cutting system. The torch is releasably connected to an oxygen hose and a fuel gas hose. It is common in the industry for the oxygen hose to be colored green and the fuel gas hose to be colored red. These two hoses are typically assembled together to form a unitary hose bundle which is convenient for the operator to manipulate in the work place.

The oxygen hose is connected to a gas pressure regulator which is in fluid communication with a cylinder shut-off valve mounted on the oxygen cylinder or tank. Industrial oxygen cylinders are typically rated for pressures of up to 3000 lbs. per square inch (psi) although higher rated cylinders are available. The pressure regulator is used to variably reduce the outlet pressure coming from the cylinder and going into the hose. The outlet pressure from the pressure regulator needs to be variable, depending on the size of the cutting tip used. Generally speaking, the oxygen pressure at the outlet of the pressure regulator may range between 10 and 90 lbs. psi gauge ("PSIG"). Higher outlet pressures are used with high speed and larger sized cutting tips, while lower outlet pressures are used with lower sized cutting and welding tips. The appropriate outlet pressure from the pressure regulator is best determined by reference to a cutting tip chart which lists optimum pressures and flow rates for each different size tip. The oxygen connectors on the hose and regulator are a special size thread which is specified by the Compressed Gas Association ("CGA").

The fuel gas hose connects to a gas pressure regulator, identical to the gas pressure regulator for the oxygen cylinder, which is in fluid communication with the cylinder shut-off valve on the fuel gas cylinder or tank. Acetylene is a commonly used fuel gas for cutting torches, as described above. A typical acetylene cylinder is formed with an interior porus mass which is saturated with liquid acetone. Acetylene gas is absorbed by the liquid acetone to facilitate safe storage. When the cylinder shut-off valve is opened, the acetylene gas vaporizes and migrates to the top of the acetylene cylinder where it passes through the cylinder shut-off valve and the pressure regulator into the fuel gas hose which feeds the torch. Industrial acetylene cylinders are typically rated for pressures of 400 PSIG at 105° F. Outlet pressures of acetylene at the pressure regulator vary, depending on the size of the cutting tip in use, but typically ranges between 1 and 15 PSIG. Larger cutting and heating tips and require higher pressures while smaller cutting and heating tips require lower pressures. Again, the operator should make reference to a cutting tip chart to determine optimal outlet pressures and flow rates. The fuel gas connectors on the hose and pressure regulator are special size left hand threads which are specified by the CGA to avoid confusion.

Flashback occurs when the flame front migrates from outside the torch tip to the inside of the torch, which causes the torch to become very hot and, if allowed to burn, may even cause it to melt. The flame front can also migrate upstream back into one or both hoses, causing them to burn or rupture. Furthermore, in some situations, the flame front may migrate further upstream into the pressure regulator and/or the gas cylinder, causing them to explode.

Various types of safety devices have been developed for use in typical oxy fuel cutting systems. For example, U.S. Pat. No. 4,286,620 assigned to Victor Equipment Company, the assignee of the present invention, which is specifically incorporated herein by reference, discloses a combination torch and check valve assembly. In the '620 patent, which issued on Sep. 1, 1981, the check valves are internal to the torch and are designed to reduce the possibility of reverse flow of gases from the torch into the hose.

U.S. Pat. No. 4,409,002 discloses a utility torch having a head mixer, which patent is specifically incorporated herein by reference. This patent is also assigned to Victor Equipment Company, the assignee of the present invention. The integral head mixer disclosed in the '002 patent, which issued on Oct. 1, 1983, is also designed to reduce the possibility of a flashback migrating from the torch upstream to other components in a typical oxy fuel cutting system.

Furthermore, U.S. patent application entitled "Torch with Integral Flashback Arrestors and Check Valves" filed Feb. 10, 1993 and preliminarily assigned Ser. No. 08/017734, and assigned to Victor Equipment Company, the assignee of the present invention, and which is specifically incorporated herein by reference, discloses a torch with an integral flashback arrestor assembly.

Other devices known generally in the art as "flashback arrestors" have been developed to reduce the possibility of migration of a flashback from the torch into the hose. These flashback arrestors are generally sold in pairs as after-market accessories. Victor Equipment Company also sells, as an accessory item, a pair of flashback arrestors which can be connected between the torch and the hose in the oxygen flow path and the fuel gas flow path. There is also a model that fits between the regulator and the hose.

The flashback arrestor manufactured by Victor Equipment Company is marketed under the trade name FLAMEBUSTER. It includes a porus, powdered metal sintered arrestor and check valve which is designed to reduce the possibility of a flashback from migrating upstream of the sintered component. The porus flashback arrestor has numerous tortuous pathways through which a flame front must pass in order to migrate further upstream into other components in an oxy fuel cutting system. In most circumstances, a flame front will be quenched as it attempts to move through the tortuous pathways in the porus flashback arrestor.

Victor Equipment Company also manufactures another accessory item which is marketed under the trademark FLAMEBUSTER PLUS. This accessory item includes a pair of flashback arrestors and check valves with quick hose connectors manufactured in a cartridge-like format. One cartridge is for oxygen and the other cartridge is for fuel gas. Numerous other competitors manufacture accessory units which include a flashback arrestor and check valves. These accessory items can be readily purchased from welding supply stores across the country.

Porous metal flashback arrestors, including the present invention, are not fool-proof devices and do not guarantee that the flame front will be quenched in all circumstances. For example, if the porous metal flashback arrestor is overheated, it may not quench the flame front. If the flashback arrestor has been exposed to numerous prior flashbacks, the tortuous pathways may be eroded, thereby reducing the quenching capability. The after-market flashback arrestors sold by Victor Equipment Company and others are not universally used in the trade. A pair of aftermarket flashback arrestors typically cost $40.00 to $60.00 (1992 Dollars). The additional cost deters some individuals from buying this after-market flashback arrestors and adding them to their oxy fuel cutting systems. Some individuals are simply not safety conscious and do not see a need for these accessory items. If a pair of accessory flashback arrestors have been installed on the job, they may sometimes be clogged with debris and be taken out of the system by the operator. Existing flashback arrestors sold as after-market items do not use the parts in place principle nor can they be repaired. If they are clogged or otherwise malfunction they must be replaced.

Some of these after-market accessory items are rather heavy and cumbersome and, if attached to the torch, may adversely affect the balance thereof which is irritating to the operator. Because these after-market accessories are readily removable, the operator may take them off of the torch.

Those skilled in the art will recognize that regulators are reconditioned on an as-needed basis. In a typical fabrication plant an operator will go to a tool crib and be issued a regulator for a specific project. At the conclusion of that project, the regulator will be returned to the tool crib. This sort of heavy industrial use eventually renders the regulator unsuitable for further cutting. The inlet filter may be clogged or other malfunction may occur such as damage to various components of the regulator. The tool crib foreman will have a large number of regulators in supply, depending on the size of the plant. When a regulator ceases to function properly, it will be set aside until a suitable quantity of malfunctioning regulators have been accumulated. These malfunctioning regulators will then be sent to a welding supply shop or to a reconditioning shop which will recondition the regulators and bring them back to operational specifications. Regulators manufactured by Victor Equipment Company are reconditioned during their usual life span which may be as long as 10 or 20 years. It may be necessary during the useful life of these regulators to replace the flashback arrestor, if any, on one or more occasions, depending upon the nature of use to which the regulators is exposed. Existing flashback arrestors are not subject to repair. They are to be replaced, and thus a new one must be purchased. This added expense deters replacement of flashback arrestors in existing systems during reconditioning.

The present invention includes a pressure regulator which has a replaceable flashback assembly which is formed as an integral part of the pressure regulator body. The flashback assembly is easy to replace and costs less than after-market flashback arrestors. This invention uses the parts in place principle (PIP) as an additional safety feature. If the flashback assembly is removed from the pressure regulator, the pressure regulator can no longer be connected to the torch hose.

The present invention does not prevent the occurrence of a flashback. Rather, the invention is designed to reduce the possibility that a flashback which does migrate upstream from the torch handle into the hose, regardless of whether a flashback arrestor is installed in the torch handle, will reach the gas cylinder. The invention is intended to provide an added measure of safety. The present invention is not fool-proof however, and, under certain circumstances, it will not prevent migration of a flashback into the cylinder.

SUMMARY OF THE INVENTION

The present invention includes a pressure regulator with a replaceable flashback arrestor and check valve. The flashback arrestor and check valve are formed into an integral flashback assembly. The flashback assembly is removably positioned in the pressure regulator housing at the gas outlet such that it is in fluid communication with the gas hose.

The flashback assembly can be easily replaced. The replaceable flashback assembly includes three primary components as follows:

(a) a flashback arrestor which is a porous metal sintered part which is designed, in most instances, to quench a flame front passing therethrough;

(b) a retainer which supports the porous metal flashback arrestor; and (c) a check valve sub-assembly disposed within the retainer to reduce the possibility of a reverse flow of gas from the hose into the pressure regulator and gas cylinder.

The invention further utilizes the PIP principle so that the pressure regulator cannot be hooked up to the gas hose if the flashback assembly has been removed from the pressure regulator.

The check valve sub-assembly is open during normal operation of the torch, allowing gas to flow from the pressure regulator through the check valve sub-assembly through the hose and torch to the cutting tip. If a reverse gas flow situation develops, the check valve sub-assembly is designed to close, in most instances, to reduce the possibility of reverse flow of gas from the hose into the pressure regulator.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiment thereof which is illustrated in the appended drawings.

It is noted, however, that the appended drawings illustrate only a typical embodiment of the invention and are therefore not to be considered limiting of its scope, for the invention may admit to other equally effective embodiments.

FIG. 10 is an enlarged section view of the retainer taken along line 10—10 of FIG. 8;

FIG. 11 is an enlarged section view of the porous metal flashback arrestor taken along line 11—11 of FIG. 8;

FIG. 12 is an enlarged section view of the check valve sub-assembly; and

FIG. 13 is an enlarged front end view of the valve sub-assembly taken along line 13—13 of FIG. 12.

DESCRIPTION OF THE PREFERRED EMBODIMENT

Figure 1:
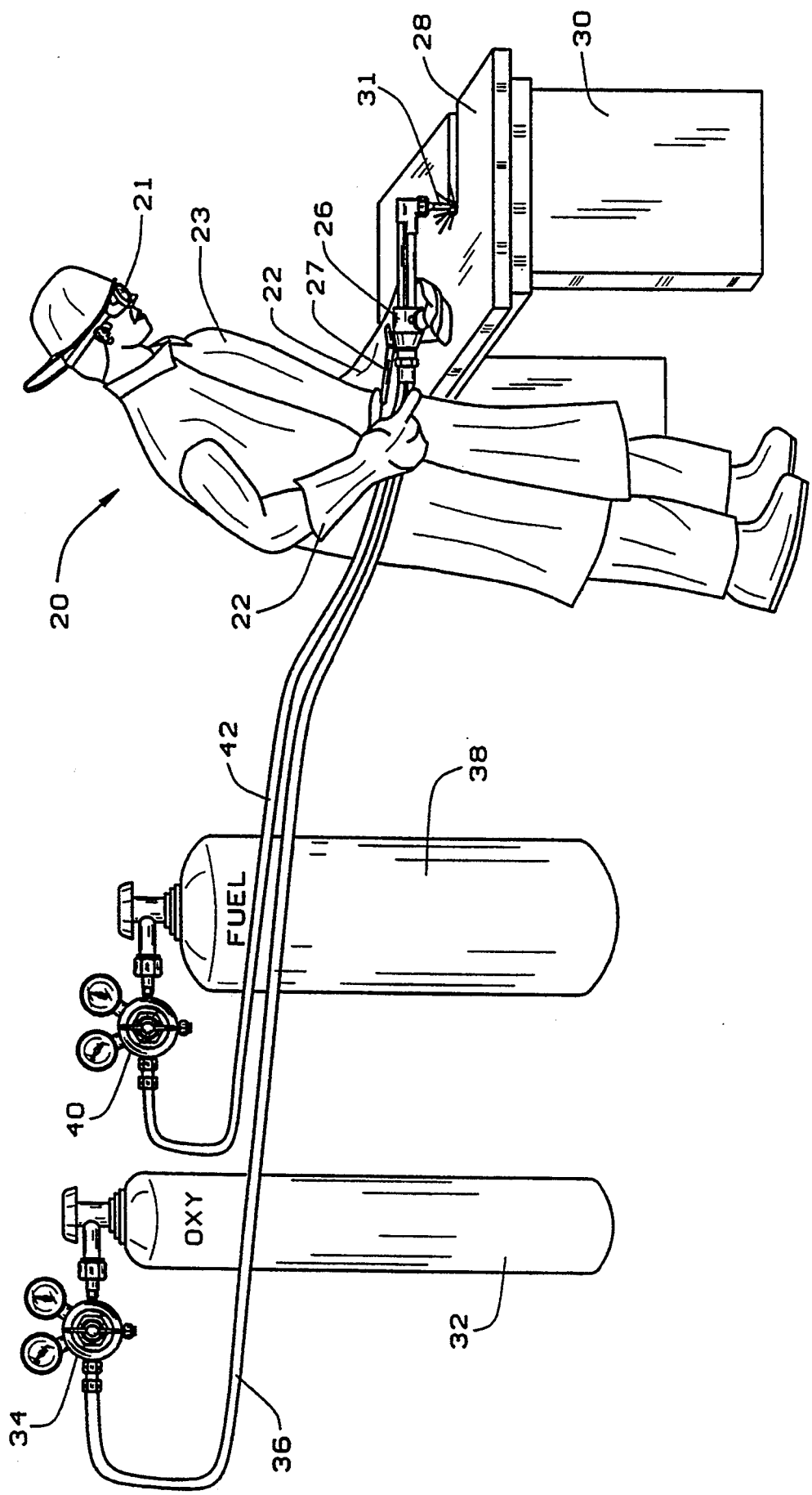
FIG. 1 is a view of a person utilizing an oxy fuel cutting torch to cut a work piece, showing the pressure regulators connected between the hoses and respective cylinders.

Referring to FIG. 1, there is shown a man 20 utilizing an oxy fuel torch 26 to cut a work piece 28, wearing protection goggles 21, suitable gloves 22, and a smock 23. Specifically, the work piece is supported on a table 30. As described in the background of the invention hereinabove, an oxy fuel torch utilizes two gases, namely oxygen and a fuel gas. An oxygen cylinder or tank 32 is shown which has an outlet connected to a pressure regulator 34 which is in communication with torch 26 via oxygen hose 36. A fuel gas cylinder or tank 38 is shown having its outlet connected to a pressure regulator 40 which is in communication with torch 26 by fuel gas hose 42. It should here be appreciated that pressure regulators 34 and 40 are identical in form, function, and operation. Pressure regulators 34, 40 allow the reduced pressure gases from the respective cylinders 32, 38 to flow through respective hoses 36, 42 to the torch 26 for the cutting operation. In order to operate torch 26 and cult a work piece, the gases under pressure within the cylinders need to be reduced in pressure before being fed to torch 26. In order to reduce the pressure of the respective gas contained within the cylinder, pressure regulators 34, 40 are interposed between respective lines 36, 42 and respective cylinders 32, 38. Pressure regulators 34, 40 provide a variably adjustable step-down of the gas pressure from the respective cylinder 32, 38 in order to accommodate the various cutting tips as described hereinabove.

Figure 2:
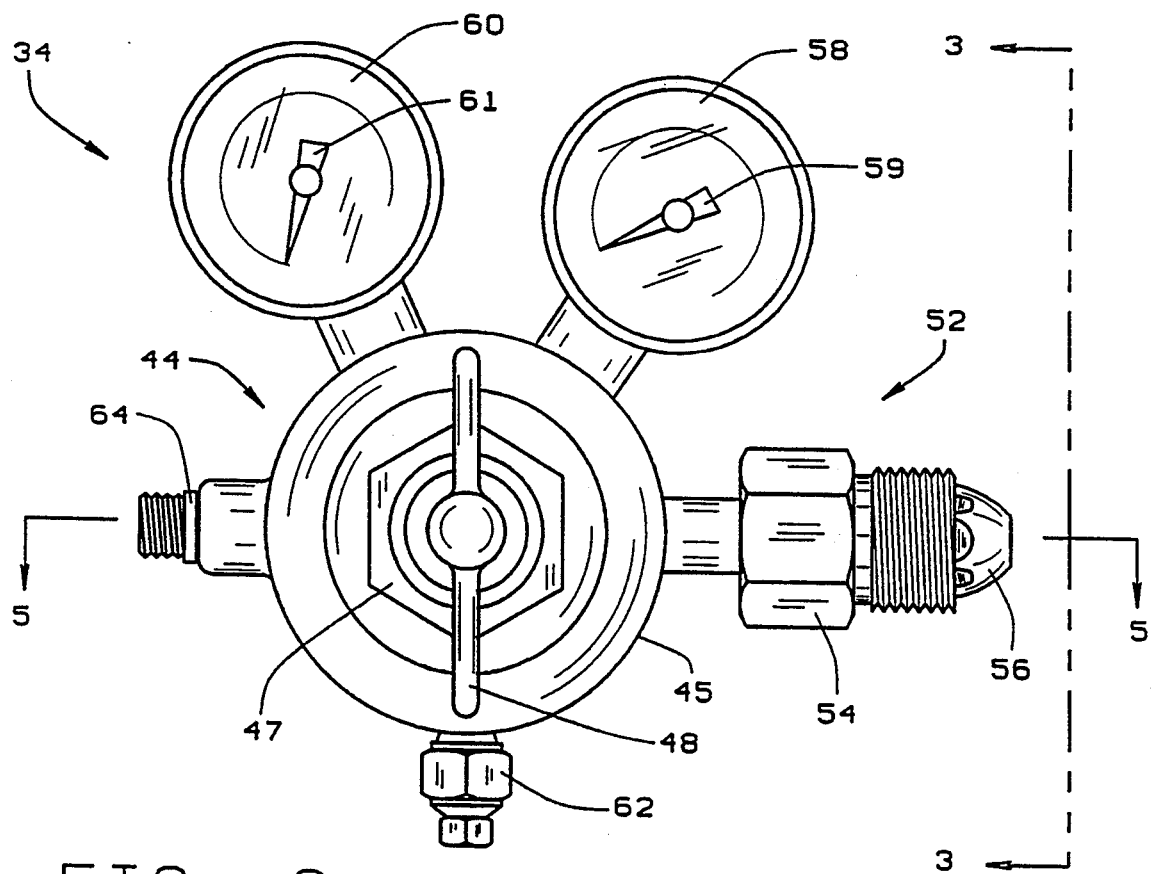
FIG. 2 is a front elevation view of a pressure regulator.
Figure 3:
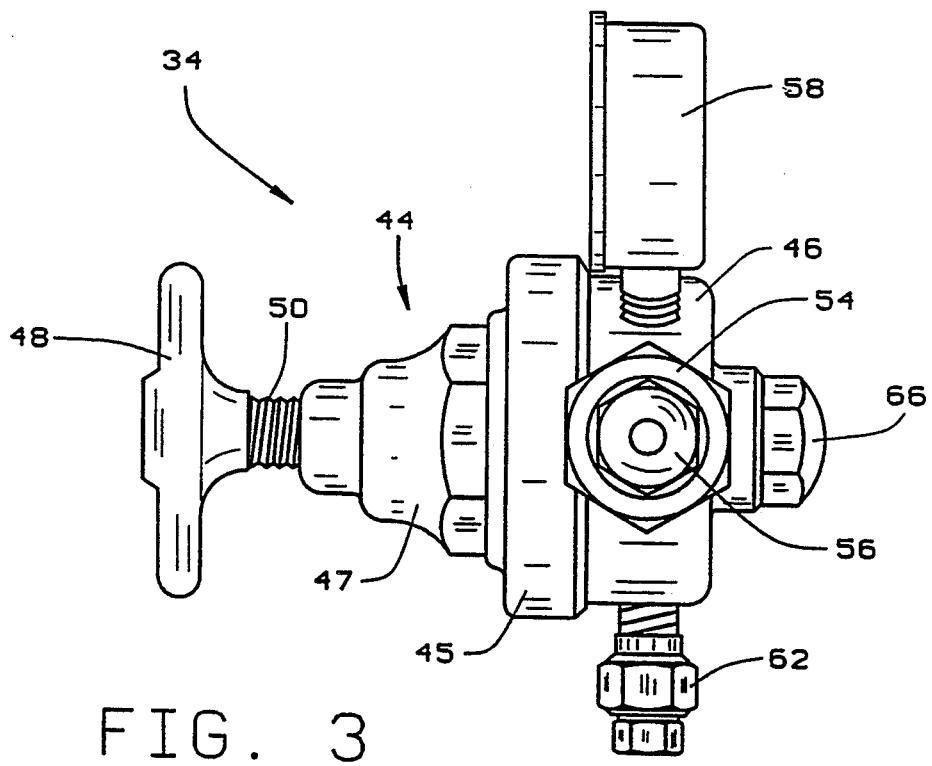
FIG. 3 is a side elevation view take along line 3—3 of FIG. 2.

Referring now to FIGS. 2 and 3, there is shown an enlarged elevation view of pressure regulator 34. As stated hereinabove, pressure regulator 40 is identical in form, function, and operation as pressure regulator 34 and thus, although the various figures and accompanying textural description is only directed to pressure regulator 34, the description and operation are equally applicable to regulator 40. Pressure regulator 34 includes a first housing part or cap 44 threadedly attached to a second housing part 46. As best seen in FIG. 3, housing part 44 includes a cylindrical portion 45 and a concentric elongated stepped portion 47. Cylindrical portion 45 includes internal threads (not shown) that threadedly engage housing part 46. Elongated step portion 47 includes internal threads 49 (See FIG. 4) for receiving threads 50 of handle 48 such that handle 48 is longitudinal movable in both the forward and backward direction. As will be described further hereinbelow, handle 48 actuates a valve assembly 112 (see FIGS. 4–6) within pressure regulator 34 which controllably adjusts the output pressure of the gas.

Connected on one side of housing half 46 is a gas inlet assembly 52. Gas inlet assembly 52 comprises a threaded nut 54 and an elongated hose connector 56. Gas inlet assembly 52 connects to the appropriate cylinder interface permitting communication between the cylinder and pressure regulator 34. Pressure regulator 34 further includes a high pressure gauge 58 with an indicator needle 59, and a low pressure gauge 60 with a corresponding indicator needle 61. As will be described below with reference to the appropriate figures, gauges 58 and 60 are respectively in communication with a high pressure gas chamber 76 (see FIG. 4) formed as an integral part of housing half 46 and a low pressure gas chamber 78 (see FIG. 4) defined by housing halves 44 and 46. Disposed at the bottom of housing half 46 is a relief valve 62 which is in communication with the low pressure chamber to provide venting of the low pressure gas should pressures rise above a set low pressure valve. On the outlet side of pressure regulator 34 is a flashback assembly 64, described in detail hereinbelow, that is threadedly engaged to body 46. At the rear of body 46 is a pressure valve back plug 66 which holds the valve assembly 112, described below, within housing half 46.

Figure 4:
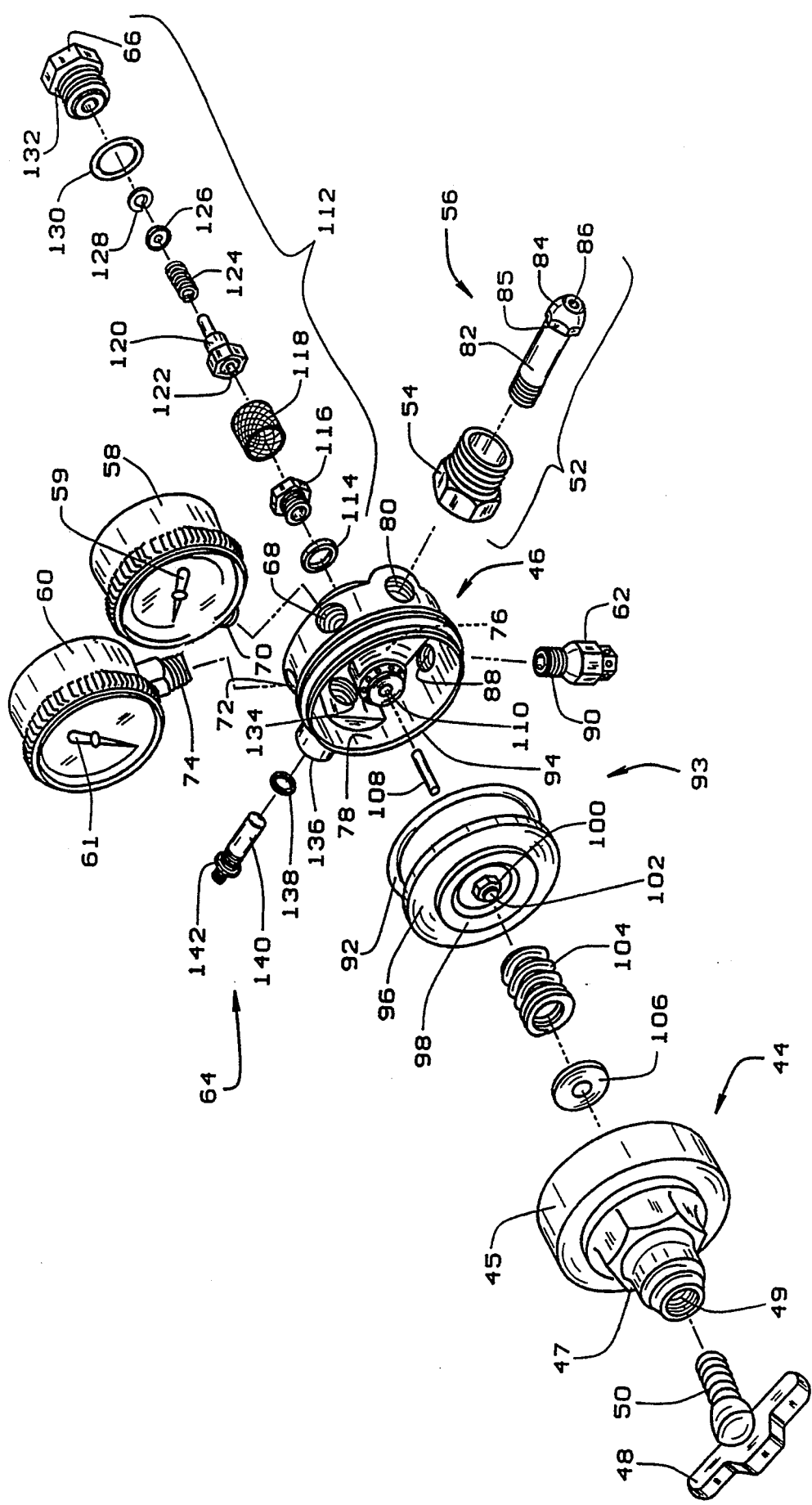
FIG. 4 is an exploded view of the various components comprising the pressure regulator of FIG. 2.

Referring now to FIG. 4, there is shown regulator 34 in an exploded view. For purposes of FIG. 4, the structure and parts of pressure regulator 34 will be described and not the operation thereof. Pressure regulator 34 includes housing half 46 which defines a first chamber or high pressure chamber 76 which is enclosed and not visible, thus the phantom line to 76. Housing half 46 defines a second chamber or low pressure chamber 78. Housing half 46 includes a threaded high pressure bore 68 in which is received threaded high pressure connector 70 of high pressure gauge 58 such that high pressure gauge 58 is in communication with high pressure chamber 76. Housing half 46 also includes a threaded low pressure bore 72 which threaded receives threaded low pressure connector 74 of low pressure gauge 60 such that low pressure gauge 60 is in communication with low pressure chamber 78.

Gas from the cylinder enters pressure regulator 34 via gas inlet assembly 52. Housing half 46 includes a threaded gas inlet bore 80 in which threaded elongated cylindrical shaft 82 of elongated hose connector 56 is received. Radially disposed about elongated hose connector 56 is threaded nut 54. Threaded nut 54 is freely rotatable about elongated hose connector 56 but is limitedly axially moveable along elongated hose connector 56 as threaded nut 54 is limited in one direction by housing half 46 and limited in the other direction by head 84 of elongated hose connector 56. Head 84 wrench flats 85 for tightening hose connector 56, and further includes an orifice 86 which provides communication to chamber 76. Thus, gas inlet assembly 52 provides the communication between the cylinder and pressure regulator 34. In communication with low pressure chamber 78 is a check valve 62. Check valve 62 includes a threaded end 90 which is threadedly received in threaded bore 88 in housing half 46. Check valve 62 provides pressure relief should a problem exist in the outlet line or otherwise. Housing half 46 also includes a threaded outlet gas bore 134 diametrically opposed to threaded gas inlet bore 80 in which is received a threaded holder 136. Threaded holder 136 threadedly receives flashback assembly 64, described in detail hereinbelow with reference to the appropriate figures, but which includes a porous metal flashback arrestor 140 and retainer 142. An o-ring 138 is disposed around retainer 142 within threaded holder 136.

As can now be appreciated from the foregoing description, pressure regulator 34 is in fluid communication with a respective cylinder such that the gas within the cylinder may flow into pressure regulator 34 via gas inlet assembly 52. Since the gas from the cylinder enters pressure regulator 34 at such a high pressure, the pressure needs to be stepped down by a factor of 10 or better. Pressure reduction is accomplished by valve assembly 112 and associated adjustment mechanism such that a range of lower output gas pressures may be variably set. To this end, handle 48 is threadedly received in elongated stepped portion 47 of housing half 44 by threads 50 such that handle 48 may axially move in the forward and reverse directions relative to housing half 44. Handle 48 abuts a spring button disk 106 which is adjacent an adjusting spring 104. Adjusting spring 104 is adjacent a diaphragm assembly 93. Diaphragm assembly 93 consists of a diaphragm disk 96 which is flexible in the axial direction. A diaphragm plate 98 is disposed adjacent to diaphragm disk 96 and is affixed thereto via a nut 100 and bolt 102. A diaphragm o-ring 92 is received about housing half 46 such that when housing half 44 is threaded thereon o-ring 92 provides sealing. Axially inwardly of diaphragm assembly 93 is an actuating pin or stem extension 108 which is received in bore 110 of housing half 46.

Figure 5:
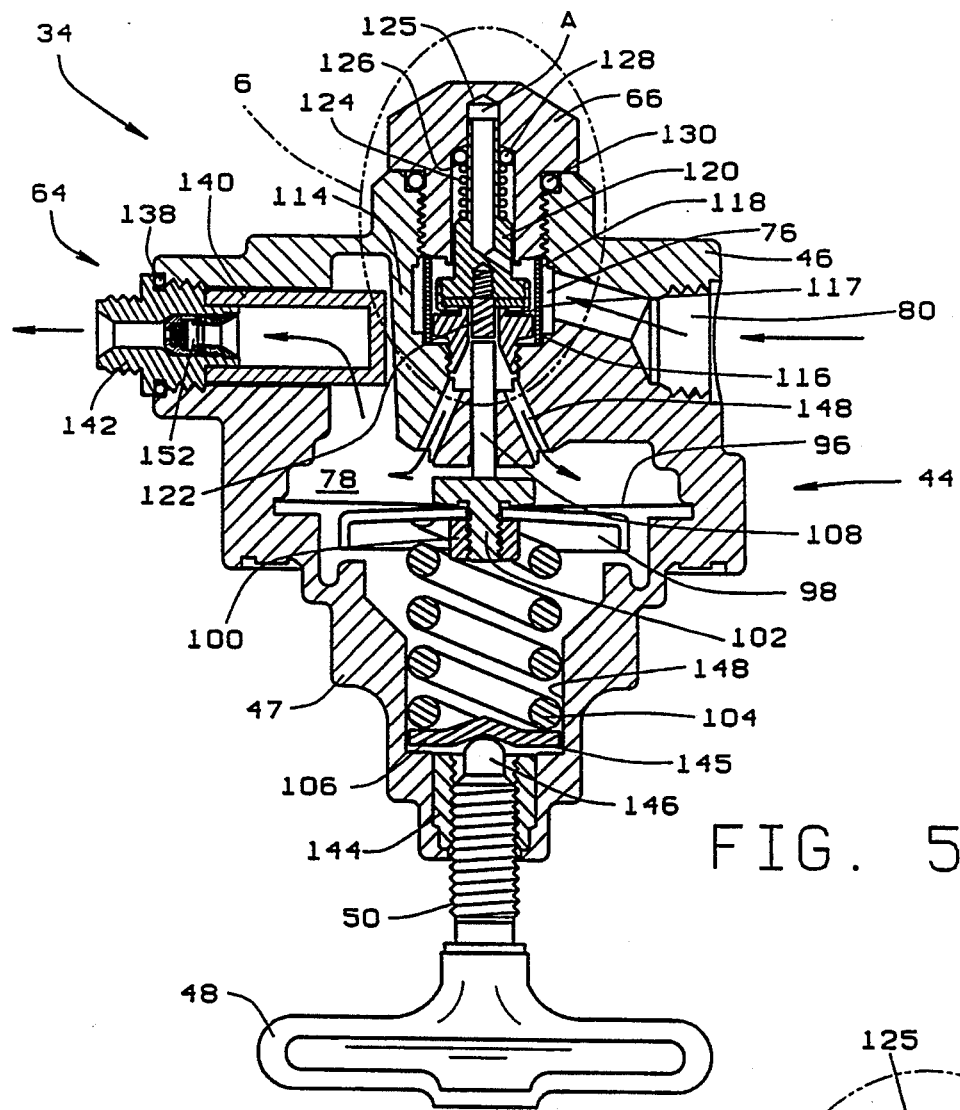
FIG. 5 is a section view taken along line 5—5 of FIG. 2.
Figure 6:
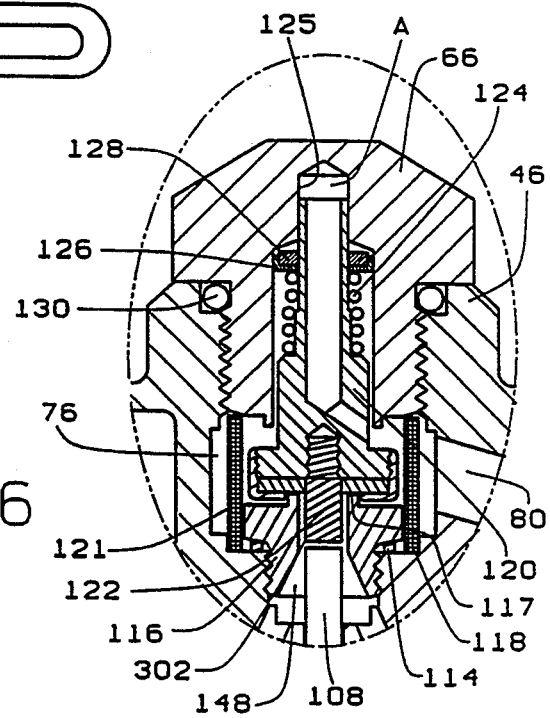
FIG. 6 is an enlarged partial section view of the valve assembly of the pressure regulator of FIG. 5.

Valve assembly 112, when assembled, is disposed within, or alternatively, adjacent chamber 76. Valve assembly 112 includes, in axially outwardly extending order, a nozzle gasket 114 and a nozzle 116, with nozzle 116 threadedly engaging housing half 46. A screen 118 radially surrounds part of valve assembly 112 as best seen in FIGS. 5 and 6. Seated axially outwardly adjacent nozzle 116 is an actuator nut 120 which has an integral pin 122. Radially surrounding actuator nut 120 is a valve spring 124 which is seated on actuator 120 at one end thereof and which abuts and seats against an annular seat or gland 126. A nylon or friction washer 128 is axially disposed on annular seat 126 while an o-ring 130 abuts seating surface 132 of end plug 66.

Referring now to FIGS. 5 and 6, the assembled valve assembly 112 is shown and the general operation of pressure regulator 34 will be described. FIG. 5 shows pressure regulator 34 in a section view, the arrows going into inlet 80 indicating the flow of gas into pressure regulator 34. As is apparent, gas flows into pressure regulator 34 via gas inlet bore 80 and directly into valve assembly 112. In FIGS. 5 and 6, valve assembly 112 is shown in the closed position whereby no gas will enter low pressure chamber 78 and thus not flow out of pressure regulator 34 via flashback assembly 64. In the closed position, valve spring 124 biases actuator nut 120 axially downwardly in FIG. 5 such that the end face 121 of actuator nut 120 abuts an end face 117 of nozzle 116 such that gas is not allowed to flow therethrough. Furthermore, in the closed position, spring 104 is in a fully extended position such that spring button 106 abuts surface 145 and head 146 of handle 48. It should be apparent that handle 48 is in its outwardly extended position. Furthermore, as spring 104 is not compressed, diaphragm disk 96 is flat and not axially extended towards valve assembly 112.

When it is desired to allow the gas to flow through valve assembly 112 and thus into gas passages 148 and into low pressure chamber 78 to exit through flashback assembly 64 and into the respective hose, handle 48 is turned such that it will axially move into stepped portion 47. As handle 48 threadingly rotates within nylon sleeve 144 head 145 abuts spring button 106 thereby compressing adjusting spring 104. As adjusting spring 104 is compressed it biases diaphragm plate 98 and thus diaphragm disk 96 axially towards valve assembly 112. The amount of flex or bias towards valve assembly 112 is determined by the spring constant of spring 104 and the biasing pressure against spring button 106 as applied by handle 48. When diaphragm disk 96 is flexed or biased axially towards valve assembly 112, bolt 102 engages pin 108 such that pin 108 engages integral pin 122 of actuator nut 120. This causes actuator nut 120 to axially move against the force of biasing spring 124. As actuator nut 120 is caused to axially move against the biasing force of spring 120, it unseats from end face 117 thereby allowing the gas to flow between end face 121 and end face 117 such that the gas flows into gas passages 148. Thus, as can be appreciated, the amount of bias exerted onto diaphragm plate 96 via spring 104 by spring button 106 and handle 48 causes actuator nut 120 to move within a predetermined distance determined by the length of the space, denoted "A" between actuator nut 120 and bore 125 in end plug 66.

When the gas enters the low pressure chamber 78 it must flow through flashback assembly 64 which is threadedly received within housing half 44. The arrows in FIG. 5 indicate the direction of flow of the gas out of pressure regulator 34 and into the respective hose.

Figure 7:
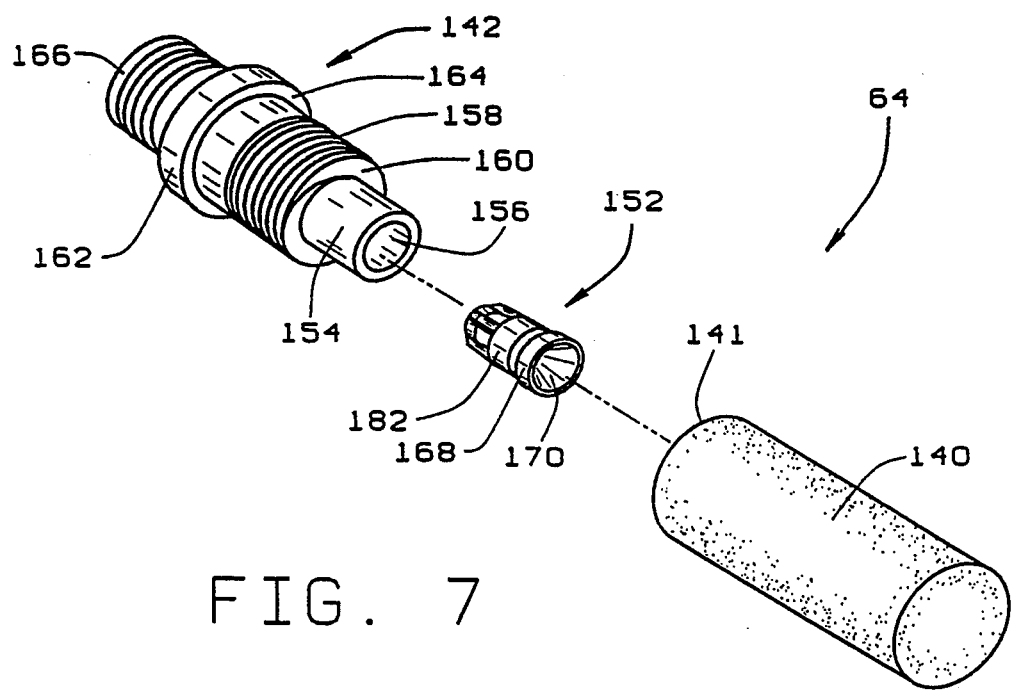
FIG. 7 is an enlarged exploded view of the flashback assembly, including its three primary components, i.e. the check value sub-assembly, the retainer, and the porous metal flashback arrestor.

Referring now to FIG. 7, there is shown an exploded view of flashback assembly 64 which consists of three primary components: a porous metal flashback arrestor 140, a retainer 142, and a check valve sub-assembly 152. Porous metal flashback arrestor 140 is manufactured from powdered stainless steel and is sintered to form an elongated cup-like structure. The porous metal flashback arrestor 140 is permeable to gas and forms tortuous pathways therethrough as indicated by the wavy flow arrows in FIG. 11. This drawing is intended to be a diagrammatic representation of the bore configuration of the porous metal flashback arrestor 42 and is not an exact pictorial representation of the physical embodiment. As previously discussed, the arrestor 140 is formed from powdered metal which is sintered into a cap-like structure. Stainless steel is used in the preferred embodiment; however, other metals may also be suitable for this application and are within the scope of this invention. Gas can pass from the exterior of flashback arrestor 140 to the interior 210 through numerous tortuous pathways as indicated by the curved flow arrows in FIG. 11 during normal operation of pressure regulator 34. In the event of a flashback, the flame front will attempt to pass from interior 210 through the tortuous pathways to the exterior flashback arrestor 140 as indicated by the large flame front arrow 300 in FIG. 11. The porous metal flashback arrestor 140 is designed to quench the flame front as it passes through arrestor 140, in most situations, and reduce the possibility that the flashback will migrate from the hose upstream into the pressure regulator or gas cylinder. As previously mentioned, the porous metal flashback arrestor 140 does not prevent a flashback from occurring. In most circumstances, the flame front may pass through flashback arrestor 140 and migrate upstream through the pressure regulator. The purpose of the porous flashback arrestor 140 is to reduce the possibility that a flame front will pass through flashback arrestor 140 and migrate upstream of pressure regulator 34 into the cylinder. Those skilled in the art will recognize that porous metal flashback arrestor 140 can be manufactured in a number of different shapes which are within the scope of this invention. For example, a solid disk or rod may be suitable in equivalent designs. A seamless tube, flat sheet, cone-shaped member, or annular band may be suitable in other equivalent designs. The shape of the porous metal flashback arrestor is not the important feature. The ability of the arrestor to quench, in most circumstances, a flame front during a flashback is the key design criteria.

In one embodiment which applicants have successfully tested, flashback arrestor 140 will stop particles 6 microns or larger. The sintered arrestor 140 used by applicants is an off-the-shelf item, purchased from Mott Metallurgical Corporation of Farmington, Conn. It has a bubble test of approximately 12" of water. The wall thickness of arrestor 140 is approximately 0.100". Other sizes and types of arrestors are suitable for this invention, depending on required flow rates and other factors known to those skilled in the art.

Retainer 142 includes an end cylindrical portion 154 of which flashback arrestor 140 radially surrounds. Flashback arrestor 140 extends over cylindrical portion 154 such that an end face 141 of flashback arrestor 140 abuts seating surface 160 of threaded cylindrical portion 158. Flashback arrestor 140 is press-fitted onto cylindrical portion 154 to form a gas-tight seal between retainer 142 and the open end of porous flashback arrestor 140. The check valve sub-assembly 152 is pressed to fit into bore 156 of retainer 142. This press-fit forms a gas-tight seal between retainer 142 and check valve sub-assembly 152.

Threads 158 threadedly engage assembly 136. Retainer 142 further includes an annular shoulder 162 which defines a seating surface 164. O-ring 138 abuts seating surface 164 and is compressed between seating surface 164 and assembly 136 when flashback assembly 164 is installed. On an end distal opening 156 is a cylindrical threaded annular portion 166 for attaching a hose connector thereto. Referring to FIG. 10, retainer 142 further includes a hexagonal chamber 208 surrounded by a tapered portion 206 through which the gas exits once it flows through check valve sub-assembly 152 as described hereinbelow.

Flashback assembly 64 further includes a check valve sub-assembly 152 which is received within end bore 156 of retainer 142. Check valve sub-assembly 152 as further described hereinbelow, allows the flow of gas only in the outgoing direction but which closes if a reverse gas flow exists or, in other words, if the pressure differential on opposite sides of the check valve are such that the pressure is less on the flashback arrestor side, check valve sub-assembly 152 will close. During certain circumstances, gas may have a propensity to flow in the opposite direction. The check valve sub-assembly 152 is designed to reduce the possibility of reverse flow by closing in some situations. Spring 190 in check valve sub-assembly 152 has a spring force of 0.015 lbs. and should close the check valve sub-assembly 152 when the pressure in inlet 170 falls to 0 PSI. However, check valve sub-assembly 152 is not designed to stop a flame front from passing through the sub-assembly.

Figure 8:
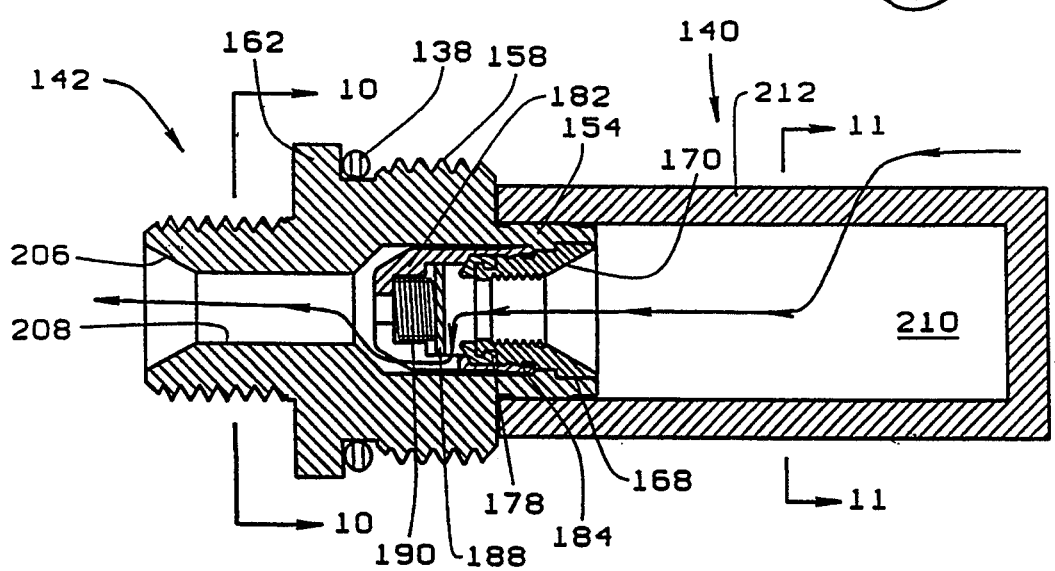
FIG. 8 is an enlarged section view of the assembled flashback assembly.

Referring now to FIGS. 12 and 13, check valve sub-assembly will be described in detail. Check valve sub-assembly includes a body 168, preferably made of a metal, which includes an inner tapered inlet 170 defining a bore 172. Bore 172 is the normal gas flow inlet bore. At the end distal inlet 170 is an annular shoulder 174 which defines an annular recess 176 disposed axially adjacent annular shoulder 174 and providing a seating lip for gasket 178. On the outer annular surface of body 168 are annular barbs 180. Annular barbs 180 serve a seating function for an end portion 184 of annular guide 182 such that end cap 182 is press fitted onto body 168. Guide 182 is preferably of a plastic material. In the preferred embodiment, guide 182 is an injection molded part formed from a thermo plastic such as high density polyethylene. Annular guide 182 partially surrounds body 168 and fully surrounds gasket 178. Further, guide 182 defines an internal space 186. Within space 186 is disposed a disk 188 and a spring 190, which essentially constitute the working valve mechanism of check valve sub-assembly 152. Guide 182 includes an annular seating surface 192 with a central orifice 190 which is in communication with space 186, such that space 186 is selectively in communication with bore 172 when disk 188 is in an open position as shown in FIG. 8. FIG. 12 shows disk 188 in the closed position. Seating surface 192 retains an end of spring 190 which is also seated on the end distal seating surface 192 against disk 188. Disk 188 abuts gasket 178 and is seated thereon in the closed position.

Referring to FIG. 13, guide 182 is shown in front view. Guide cap 182 includes a central orifice 194 which is surrounded by an annular portion 196. Annular portion 196 is connected to end portion 184 by fingers 198, 199, 200, 201 which are equalannularly spaced about annular portion 196. Thus, fingers 198, 199, 200, 201 define four vents 202, 203, 204, 205. The four vents 202, 203, 204, 205 are all in fluid communication with inlet 172 of body 168.

Figure 9:
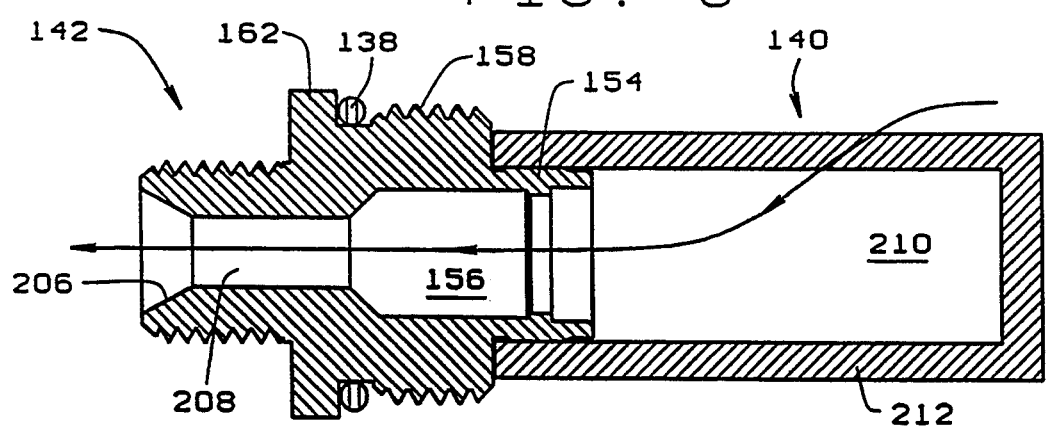
FIG. 9 is an enlarged section view of the flashback assembly without the check valve sub-assembly.

Referring now to FIG. 9, flashback assembly 64 is shown without check valve sub-assembly 152 in order to show the normal direction of gas flow as indicated by the arrow. Gas enters through annular or cylindrical wall 212. As shown in FIG. 11, since flashback arrestor 140 is made of a sintered metal, there are many tortuous paths as indicated by the wavy arrows that the gas and thus a flame front must navigate (in the direction as indicated by arrow 300) in order to penetrate into interior chamber 210.

Referring to FIG. 8, check valve sub-assembly 152 is shown inserted within bore 156 of retainer 142 as it is normally positioned in flashback assembly 64. FIG. 8 shows check valve sub-assembly in the open position in which spring 190 is compressed by disk 188 because of the flow of gas, or pressure exerted by the gas against disk 188 as it enters tapered inlet 170 of body 168. As the gas flows through check valve sub-assembly 152, it must flow through vents 202,203,204,205 to then exit hexagonal chamber 208 to then go into the proper hose.

Thus, should the gas try to enter flashback assembly 64 in the direction of the arrow 300 indicated in FIG. 8, through hexagonal bore 208, then check valve sub-assembly 152 will most likely close because of the pressure differential to stop the flow of gas in the reverse direction. Should a flame front continue because there is no pressure differential to close check valve sub-assembly 152, the flame front must then navigate from interior chamber of porous metal flashback arrestor 140 through the tortuous pathways provided by the sintered annular wall 212 as indicated by the large arrow in FIG. 11.

OPERATION

Although the operation of the various components have been described hereinabove, the following is a recap of the operation of a pressure regulator in accordance with the present invention. The pressure regulator is attached to the appropriate gas cylinder via gas inlet assembly 52. The appropriate hose is attached to the outlet side of pressure regulator via flashback assembly 64. The pressure regulator should initially be in the closed position thus handle or manual valve actuator 48 is the fully extended position as depicted in FIG. 5. Thus, spring 124 biases nut 120 into the closed position seated against surface 117 of nut 116. When the operator is ready to use the oxy fuel torch, the valve to the cylinder is opened and the output pressure of the respective gas is set by rotating handle 48 which biases disk 106 to compress spring 104 which abuts diaphragm assembly 93. Diaphragm plate 96 flexes axially to push pin 108 to bias nut 120 against the force of spring 124 to allow the incoming gas from bore 80 to flow through screen 118. Thereafter, the gas flows into channel 302 defined by nut 116 and into gas passages 148 (see FIG. 6). The plurality of gas passages 148 open into low pressure chamber 78 which is in communication with gas outlet 134 in which is disposed flashback assembly 64. The gas must pass through flashback arrestor 140 via the tortuous pathways to the interior 210 thereof. At this point the gas then flows into check valve sub-assembly 152 via inlet 170 (see FIG. 8). The pressure of the gas biases disk 188 against the force of spring 190 to unseat disk 188 from gasket 178. The gas then flows through vents 202,203,204,205 (see FIG. 13). At this point the gas then flows through hexagonal chamber 208 and into the respective hose.

If for some reason the pressure within chamber 210 of flashback 140 falls to 0 PSIG, then the force of spring 190 and check valve sub-assembly 152 biases disk 188 into the closed position resting against gasket 178 to stop the reverse flow of gas. Should, however, a flame front pass upward through the hose towards the pressure regulator, and check valve sub-assembly 152 is in the open position, the flame front must pass through the flashback arrestor 140.

While the foregoing is directed to the preferred embodiment of the present invention, other and further embodiments of the invention may be devised without departing from the basis scope thereof, and the scope thereof is determined by the claims which follow.

What is claimed is:

1. A pressure regulator for controllably regulating output pressure of a gas from a pressurized gas tank, the pressure regulator comprising:
   a housing;
   a gas inlet disposed in said housing;
   a gas outlet disposed in said housing;
   a first chamber defined by said housing and in communication with said gas inlet;
   a second chamber defined by said housing and in communication with said gas outlet;
   an adjustable valve assembly having a valve in communication with said first chamber and an outlet in communication with said second chamber said valve adjustably reducing the pressure of the gas at said valve outlet; and
   a flashback assembly disposed within said gas outlet, said flashback assembly including:
   a check valve sub-assembly to reduce the possibility of reverse gas flow into the pressure regulator via said gas outlet;
   a retainer having an orifice therethrough, said retainer defining a seating surface at a first end and a hose connector at a second end, said orifice sized and dimensioned to receive said check valve sub-assembly; and
   a flashback arrestor mounted on said seating surface to reduce the possibility of migration of a flashback into the regulator via said gas outlet.

2. The apparatus of claim 1, wherein said flashback arrestor is formed from a porous, powdered stainless steel sintered cup which is permeable to gas.

3. The apparatus of claim 1, wherein said check valve subassembly further includes:
   a valve body having a bore therethrough, said bore in fluid communication with a gas hose;
   a seat engaging said valve body;
   a movable valve element positioned adjacent to said seat;
   a guide engaging said valve body, said guide having a plurality of fingers to correctly direct movement of said movable valve element; and
   a spring positioned between said guide and said movable valve element to urge said valve element into sealing engagement with said seat to reduce the possibility of reverse flow of gas into the pressure regulator.

4. A pressure regulator for variably, adjustably reducing the pressure of a gas introduced into the pressure regulator, typically from a pressurized gas cylinder, the pressure regulator comprising:
   a housing having a gas inlet and a gas outlet;
   a high pressure chamber defined by said housing and in fluid communication with said gas inlet;
   a low pressure chamber defined by said housing and in fluid communication with said gas outlet;
   an adjustable valve to set the output pressure of the gas, said valve having a valve inlet in fluid communication with said high pressure chamber, and a valve outlet in fluid communication with said low pressure chamber; and
   a removable flashback assembly disposed in said gas outlet.

5. The apparatus of claim 4, wherein said flashback assembly comprises:
   a check valve to reduce the possibility of reverse gas flow into the pressure regulator via said gas outlet;
   a retainer having an orifice therethrough, said orifice being sized and configured to receive said check valve, said retainer having a seating surface on a first end thereof, and a hose connector on a second end thereof; and a flashback arrestor disposed on said seating surface to reduce the possibility of migration of a flashback into the regulator.

6. The apparatus of claim 5, wherein said flashback arrestor is formed from a porous, powdered stainless steel sintered cap that is permeable to gas.

7. The apparatus of claim 5, wherein said check valve comprises:

a valve body having a bore therethrough, said bore in fluid communication with said flashback arrestor on a first end, and in fluid communication with said orifice on a second end;

a seat engaging said valve body;

a movable valve element positioned adjacent to said seat;

a guide engaging said valve body, said guide having a plurality of fingers to direct movement of said movable valve element; and a spring positioned between said guide and said movable valve element to urge said valve element into sealing engagement with said seat to reduce the possibility of reverse flow of gas into the pressure regulator.

* * * * *